United States Patent
Okuyama

(10) Patent No.: US 8,200,201 B2
(45) Date of Patent: Jun. 12, 2012

(54) MOBILE TELEPHONE APPARATUS AND CALL RECEPTION HISTORY PRODUCING METHOD USED BY THE SAME

(75) Inventor: Mariko Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 477 days.

(21) Appl. No.: 12/373,207

(22) PCT Filed: Jul. 11, 2007

(86) PCT No.: PCT/JP2007/063804
§ 371 (c)(1),
(2), (4) Date: Jan. 9, 2009

(87) PCT Pub. No.: WO2008/007693
PCT Pub. Date: Jan. 17, 2008

(65) Prior Publication Data
US 2009/0318120 A1    Dec. 24, 2009

(30) Foreign Application Priority Data
Jul. 12, 2006    (JP) .................. 2006-191019

(51) Int. Cl.
H04M 3/42    (2006.01)
(52) U.S. Cl. ............. 455/414.1; 455/415; 455/460; 455/412.1
(58) Field of Classification Search .......... 455/414.1, 455/412.1, 415, 460
See application file for complete search history.

(56) References Cited

U.S. PATENT DOCUMENTS

| 2004/0086099 A1* | 5/2004 | Romanski | 379/201.01 |
| 2005/0047579 A1* | 3/2005 | Salame | 379/265.09 |
| 2007/0160034 A1* | 7/2007 | Koretsky | 370/352 |
| 2009/0143050 A1* | 6/2009 | Ignatin | 455/414.1 |

FOREIGN PATENT DOCUMENTS

| JP | 2000-184453 A | 6/2000 |
| JP | 2000-188644 A | 7/2000 |
| JP | 2005-027247 A | 1/2005 |
| JP | 2005-191730 A | 7/2005 |

OTHER PUBLICATIONS

International Search Report for PCT/JP2007/063804 mailed Aug. 7, 2007.
International Preliminary Report on Patentability for PCT/JP2007/063804 issued Jan. 20, 2009.

* cited by examiner

*Primary Examiner* — Kwasi Karikari

(57) ABSTRACT

A determination result of whether a counter communication node belongs to a same network as a mobile phone apparatus itself, a different network from the mobile phone apparatus itself or a public line network is stored in a call reception history. when a call is originated by using the call reception history, a prefix number is automatically added to the call originator number based on a previous related data. The mobile IP telephone apparatus extracts a call originator number from the call originator data and recognizes that the call originator number is a public network number or a mobile phone number if the head of the number is "0". The mobile IP telephone apparatus 4 recognizes that the counter node is an extension telephone in an intra-company IP network if the head of the number is not "0". The mobile IP telephone apparatus removes a site number in case of the same network as the network to which the telephone apparatus belongs, and relates the call originator number (or name registered in a telephone directory) and data of the network to which the telephone apparatus currently belongs, without any change, and registers in a call reception history storing area as a call reception history.

2 Claims, 8 Drawing Sheets

Fig. 6A

```
CALL RECEIVED SITE: 1 1 0
CALL ORIGINATOR SITE: 1 1 0
1 2 3 4 5
```

Fig. 6B

```
CALL RECEIVED SITE: SITE A
CALL ORIGINATOR SITE: SITE A
A
```

Fig. 7

CALL RECEIVED SITE:110

CALL ORIGINATOR SITE:210

CALL RECEIVED SITE:210

CALL ORIGINATOR SITE:210

```
CALL RECEIVED SITE:110

CALL ORIGINATOR SITE: PUBLIC TELEPHONE NETWORK 0-03-1234-5678
```

Fig. 10

```
CALL RECEIVED SITE:110

CALL ORIGINATOR SITE:210

8-210-22346
```

MOBILE TELEPHONE APPARATUS AND CALL RECEPTION HISTORY PRODUCING METHOD USED BY THE SAME

This application is the National Phase of PCT/JP2007/063804, filed Jul. 11, 2007, which claims priority to Japanese Application No. 2006-191019 filed Jul. 12, 2006.

TECHNICAL FIELD

The present invention relates to a mobile phone apparatus, a call reception history producing method used by the same and its program, and more particularly, relates to a producing method of a call reception history in a mobile phone apparatus, such as a mobile IP (Internet Protocol) telephone apparatus, a mobile phone apparatus with an IP telephone function.

BACKGROUND ART

In recent years, the establishment of an intra-company network using an IP telephone apparatus has been increased. Also, as shown in Japanese Patent Application Publication (JP-P2005-27247A), a mobile IP telephone apparatus using a wireless LAN (Local Area Network) and a mobile phone apparatus with an IP telephone function have been popularized. Since an IP telephone apparatus and the mobile phone apparatus with the IP telephone function are movable, there is a case that the apparatus belongs to a network that differs from a network to which it usually belongs.

With regard to a call reception history in the IP telephone apparatus, a technique described in Japanese Patent Application Publication (JP-P2005-191730A) is known. This related art is directed to an extension telephone which uses a fixed IP telephone apparatus and determines whether a call is from a public network or from a same network, on the basis of a call originator data when the call is received. Then, a pre-fix number "0" is added to the call originator number of a call reception history in case of the public network and the added call originator number is held, or removes a site number from the call originator number of the call reception history in case of the same network and the removed call originator number is held.

In the above-mentioned conventional IP telephone apparatus and mobile phone apparatus with the IP telephone function, unless whether a counter communication node belongs to the same network as the above telephone apparatus or the different network from the above telephone apparatus or the public network is determined and left in a call reception history when a call is received, the pre-fix number must be added to the head portion of the telephone number when the call is originated on the basis of the call reception history.

Also, in the conventional IP telephone apparatus and a mobile phone apparatus with the IP telephone function, at the time of the reception of a call from the same network as the network to which the apparatus usually belongs, a company extension number leaves as a call reception history. Also, at the time of the reception of a call from the different network, it is necessary to add a site number to the company extension number to leave as the call reception history. In this way, depending on the network to which the telephone apparatus itself belongs, it is necessary to determine whether or not the site number should be added.

DISCLOSURE OF INVENTION

It is therefore an object of the present invention to provide a mobile phone apparatus in which a determination result of whether a counter communication node belongs to a same network as the mobile phone apparatus, a different network from the mobile phone apparatus or a public line network can be left in a call reception history, and a call reception history producing method used in the same.

Also, another object of the present invention is to provide a mobile phone apparatus in which, when a call reception history is used to originate a call, a pre-fix number can be automatically added based on a previously relation and the call can be originated, and an call reception history producing method used in the same.

The mobile phone apparatus according to the present invention is a mobile phone apparatus that has a storing area for storing a call reception history and can carry out a telephone communication by an IP (Internet Protocol) telephone function. The mobile phone apparatus contains a section for acquiring data of a network to which the mobile phone apparatus belongs; a section for acquiring a call originator data at a time of call reception; and a section for relating the acquired network data and the acquired call originator data to record in the storing area.

The call reception history producing method according to the present invention is a call reception history producing method used in a mobile phone apparatus that has a storing area for storing a call reception history and can carry out a telephone communication by an IP (Internet Protocol) telephone function. The mobile phone apparatus executes a process for acquiring data of a network to which the mobile phone apparatus belongs; a process for acquiring a call originator data at a time of call reception; and a process for relating the acquired network data and the acquired call originator data to record in the storing area.

A program according to the present invention is a program executed by a mobile phone apparatus that has a storing area for storing a call reception history and can carry out a telephone communication by using an IP (Internet Protocol) telephone function. This instructs a central processing unit in the mobile phone apparatus to execute a process for acquiring network data to which the mobile phone apparatus belongs; a process for acquiring call originator data at the time of a call reception; and a process for relating the acquired network data and the acquired call originator data to record in the storing area.

That is, in the mobile phone apparatus of the present invention, when the mobile IP (Internet Protocol) telephone apparatus has received a call, the data of a network to which the telephone apparatus belongs and its call originator data can be related and recorded. Thus, they can be left in the call reception history.

Also, in the mobile phone apparatus of the present invention, when the call reception history is used to originate the call, the pre-fix number can be automatically added in accordance with the previously relation, and the call can be originated.

Moreover, in the mobile phone apparatus of the present invention, when a call is received, data of a network to which the mobile phone apparatus belongs and its call originator data are related and recognized, and the determination of whether a counter communication node belongs to a same network as the mobile phone apparatus, a different network from the mobile phone apparatus or a public line network is carried out, and its result is left in the call reception history. Thus, when the call reception history is used to originate a call, the pre-fix number can be automatically added in accordance with the previous relation, and the call can be originated.

Consequently, in the mobile phone apparatus of the present invention, when the call has been received, the data of a network to which the mobile phone apparatus belongs and its call originator data are related and record, and at the time of call reception, the determination of whether the originator is the same network, the different network or the public network is carried out, and its result can be left in the call reception history. Thus, when the call reception history is used to originate the call, the pre-fix number can be automatically added in accordance with the previous correlation data, and the call can be originated.

BRIEF DESCRIPTION OF DRAWINGS

The objects, configurations, operations, effects and features of the present invention will be evident from the explanation of the exemplary embodiments with reference to the following drawings:

FIGS. 6A and 6B are diagrams showing examples of a call reception history according to the exemplary embodiment of the present invention;

FIG. 7 is a diagram showing an example of the call reception history according to the exemplary embodiment of the present invention;

FIG. 8 is a diagram showing an example of the call reception history according to the exemplary embodiment of the present invention;

FIG. 9 is a diagram showing an example of the call reception history according to the exemplary embodiment of the present invention; and FIG. 10 is a diagram showing an example of the call reception history according to the exemplary embodiment of the present invention.

BEST MODE FOR CARRYING OUT THE INVENTION

Figure 1:
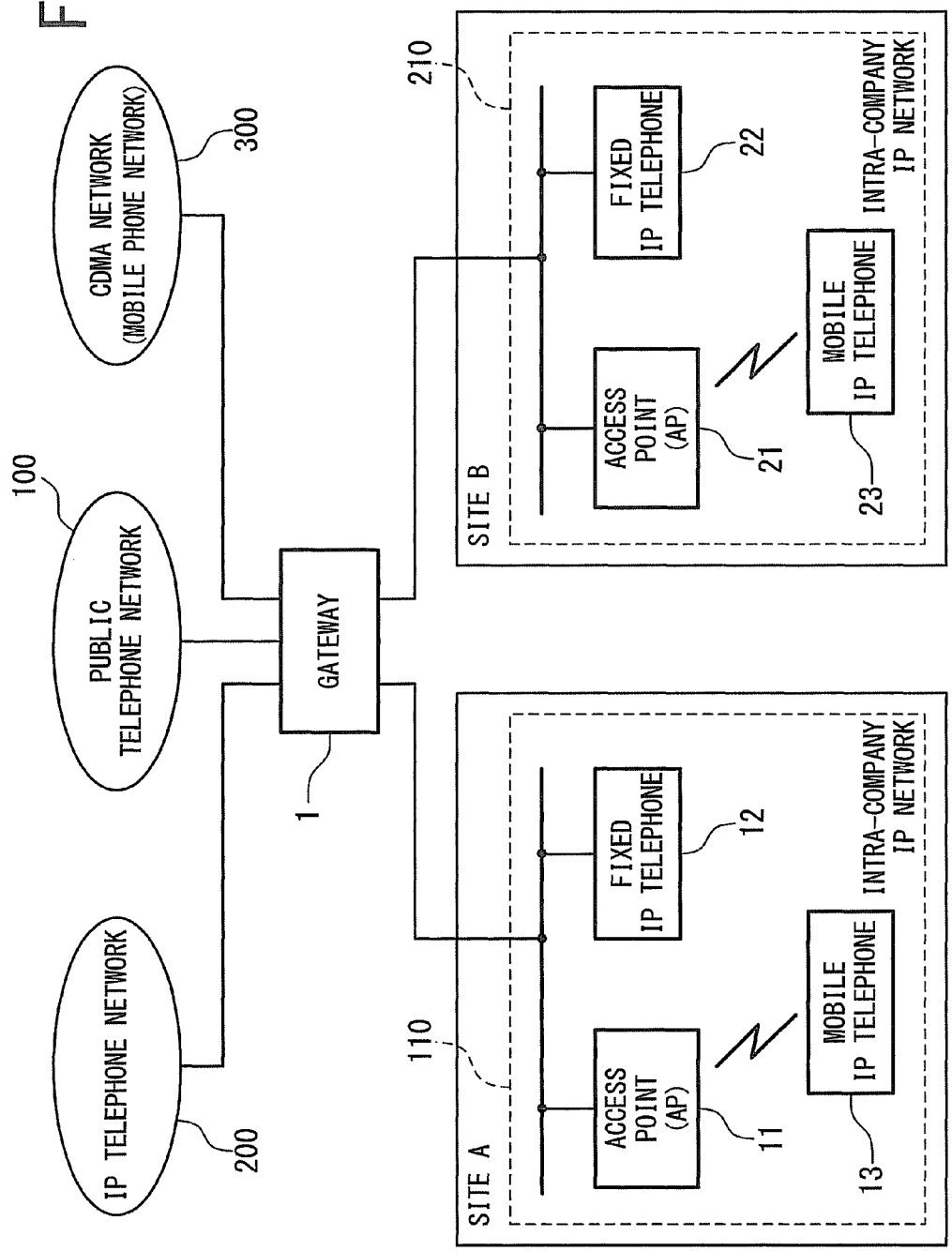
FIG. 1 is a block diagram showing a configuration of a network according to an exemplary embodiment of the present invention.

Hereinafter, a mobile phone apparatus according to the present invention will be described in detail with reference to the attached drawings. FIG. 1 is a block diagram showing the configuration of a network according to an exemplary embodiment of the present invention. In FIG. 1, in the network according to the exemplary embodiment of the present invention, intra-company IP (Internet Protocol) networks 110 and 210 provided inside of sites A and B under the assumption of companies; a public telephone network 100, an IP telephone network 200, and a CDMA (Code Division Multiple Access) network (Mobile Telephone Network) 300 are connected through a gateway 1.

An access point (AP) 11 to which a mobile IP telephone apparatus 13 using a wireless LAN (Local Area Network) belongs is connected to the intra-company IP network 110 of the site A, and a fixed IP telephone apparatus 12 is further connected thereto.

Also, similarly to the intra-company IP network 110 of the site A, an access point 21 to which a mobile IP telephone apparatus 23 belongs is connected to an intra-company IP network 210 of the different site B of the same group company as the company of the site A, and a fixed IP telephone apparatus 22 is further connected thereto.

The intra-company IP networks 110 and 210 are connected through the gateway 1 to the public telephone network 100, and public telephone numbers and intra-company extension numbers can be used in the sites A and B of the company. It should be noted that in this exemplary embodiment, a mobile phone apparatus with an IP telephone function (not shown) can be used instead of the mobile IP telephone apparatuses 13 and 23, or used together with them.

Also, in the mobile IP telephone apparatus 13 and 23, the networks (the intra-company IP networks 110 and 210) to which they belong can be changed. For example, the mobile IP telephone apparatus 13 is usually connected to the intra-company IP network 110 of the site A. However, when it goes out into the site B, it can be connected to the intra-company IP network 210 of the site B.

Figure 2:
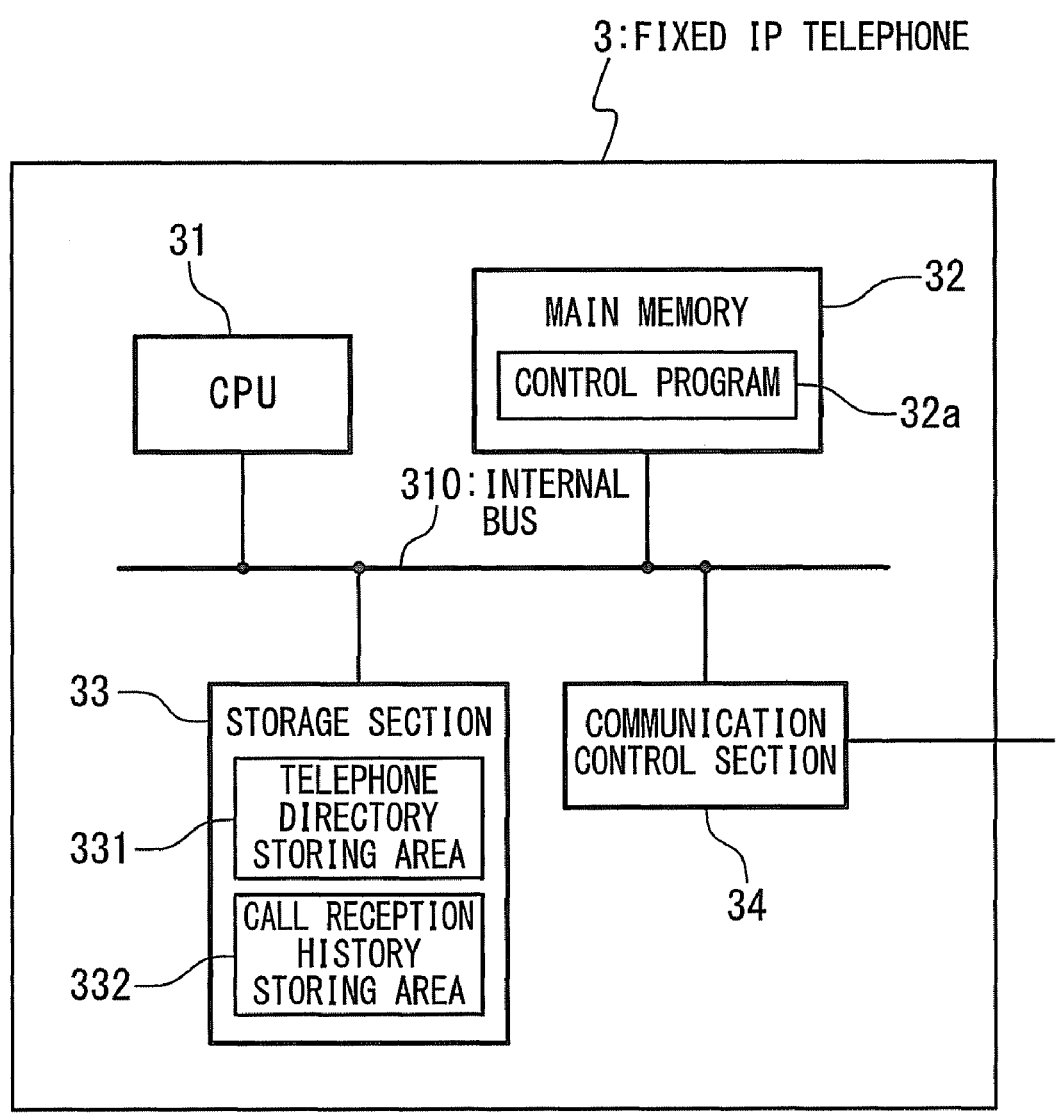
FIG. 2 is a block diagram showing a configuration example of a fixed IP telephone apparatus according to the exemplary embodiment of the present invention.

FIG. 2 is a block diagram showing the configuration example of a fixed IP telephone apparatus according to the exemplary embodiment of the present invention. In FIG. 2, a fixed IP telephone apparatus 3 contains a CPU (Central Processing Unit) 31, a main memory 32 for storing a control program 32a executed by the CPU 31, a storage section 33 that can be used as a work area when the CPU 31 executes the control program 32a, and a communication control section 34 for controlling communication in the intra-company IP networks 110 and 210. Also, the CPU 31, the main memory 32, the storage section 33 and the communication control section 34 are connected to an internal bus 310. The storage section 33 contains a telephone directory storing area 331 for holding a telephone directory, and a call reception history storing area 332 for holding a list of call reception histories. It should be noted that the fixed IP telephone apparatuses 12 and 22 shown in FIG. 1 are configured similarly to this fixed IP telephone apparatus 3. However, as for sections which do not have direct relation to the present invention, such as a sound processing section, their illustration and description are omitted.

Figure 3:
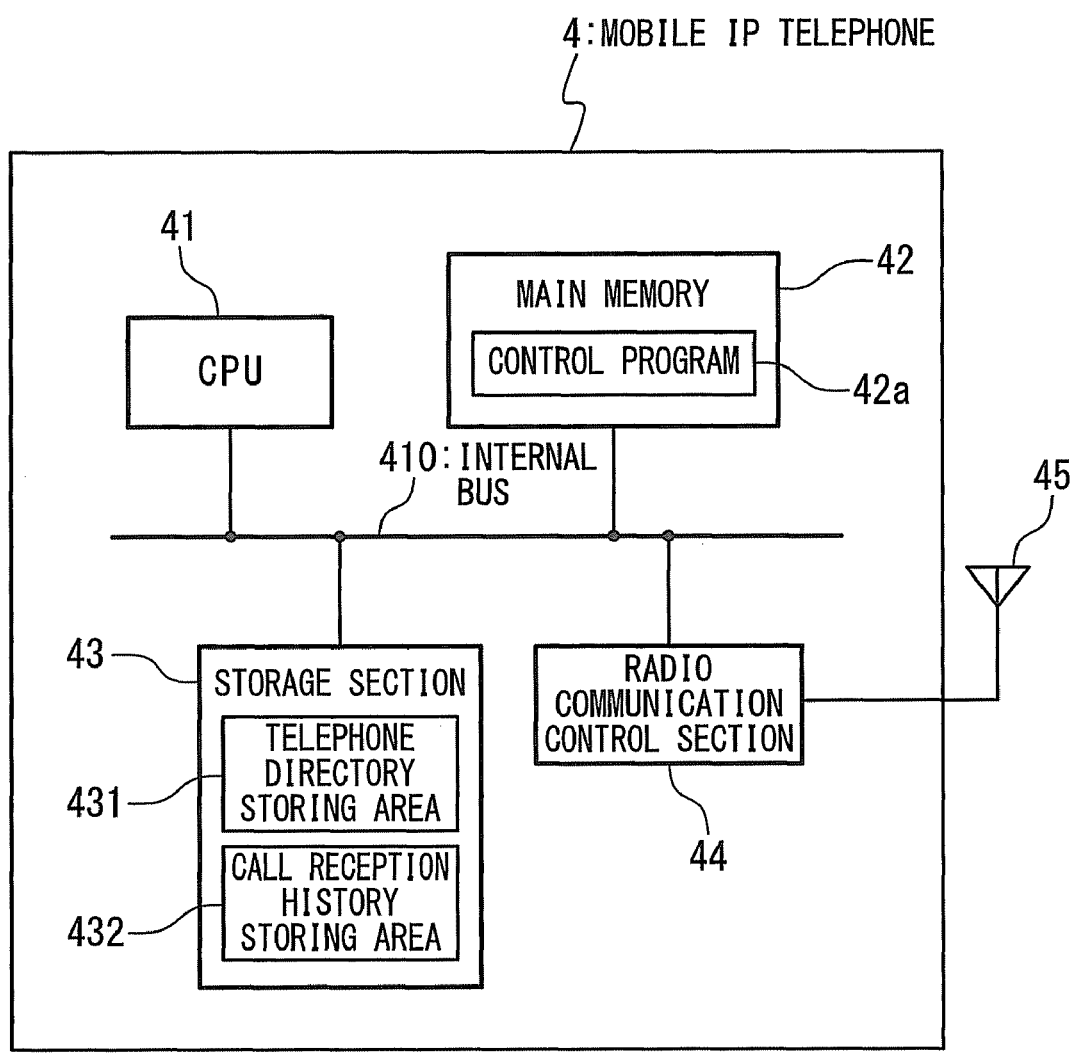
FIG. 3 is a block diagram showing a configuration example of a mobile IP telephone apparatus according to the exemplary embodiment of the present invention.

FIG. 3 is a block diagram showing the configuration example of the mobile IP telephone apparatus according to the exemplary embodiment of the present invention. In FIG. 3, a mobile IP telephone apparatus 4 contains a CPU 41, a main memory 42 for storing a control program 42a executed by the CPU 41, a storage section 43 that can be used as a work area when the CPU 41 executes the control program 42a, a wireless communication control section 44 for controlling the communication in the intra-company IP network 110 or 210, and an antenna 45. Also, the CPU 41, the main memory 42, the storage section 43 and the wireless communication control section 44 are connected to an internal bus 410. The storage section 43 contains a telephone directory storing area 431 for holding a telephone directory, and a call reception history storing area 432 for holding a list of call reception histories. It should be noted that the mobile IP telephone apparatuses 13 and 23 in FIG. 1 are configured similarly to this mobile IP telephone apparatus 4. However, sections that do not have any direct relation to the present invention, such as a sound process, their illustration and description are omitted.

A holding method of the call reception history in the mobile IP telephone apparatuses 13 and 23 and the mobile phone apparatus with the IP telephone function according to this exemplary embodiment, in which the connection network can be switched, will be described below.

Figure 4:
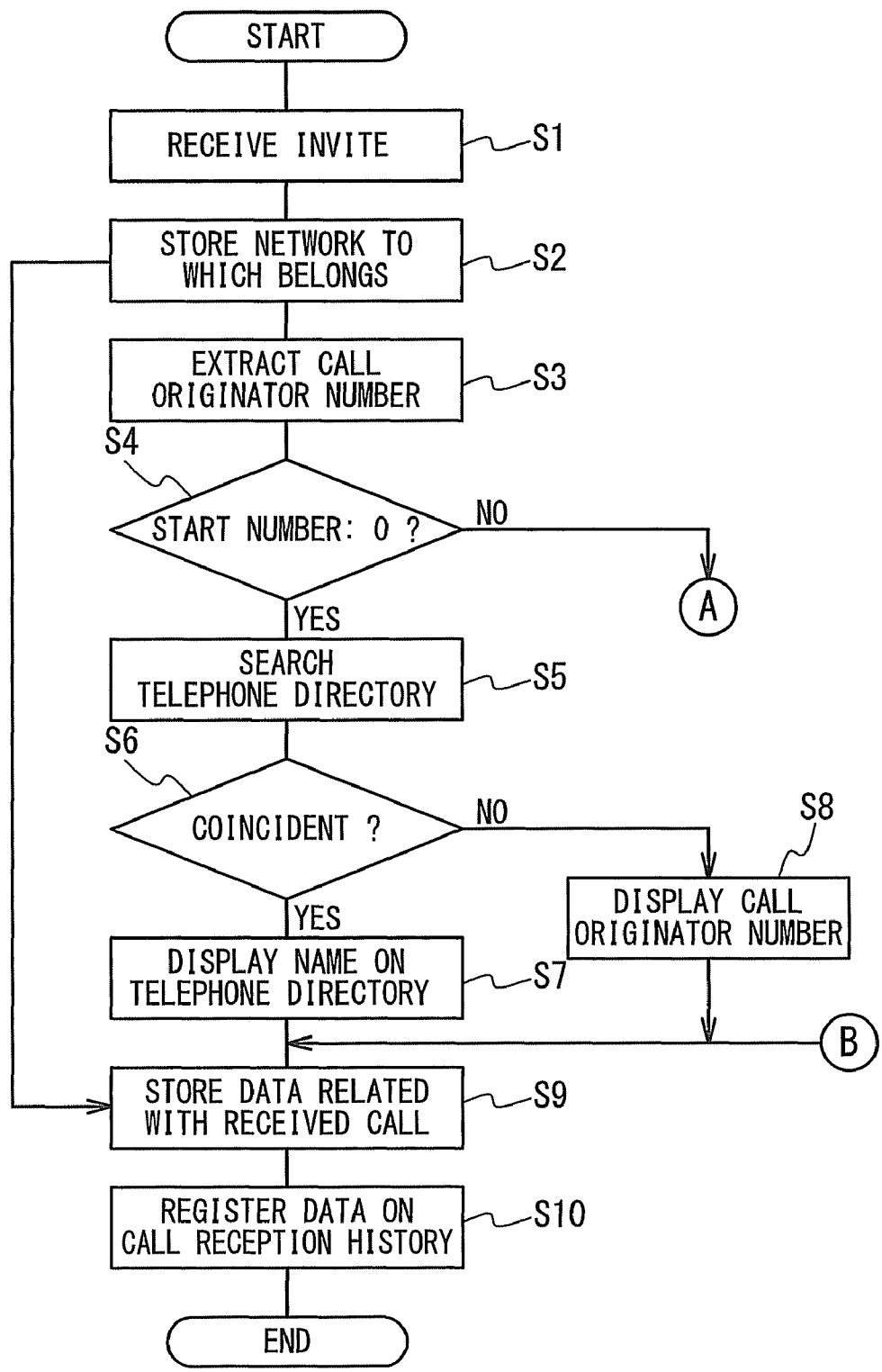
FIG. 4 is a flowchart showing an operation example of a mobile IP telephone apparatus according to the exemplary embodiment of the present invention.
Figure 5:
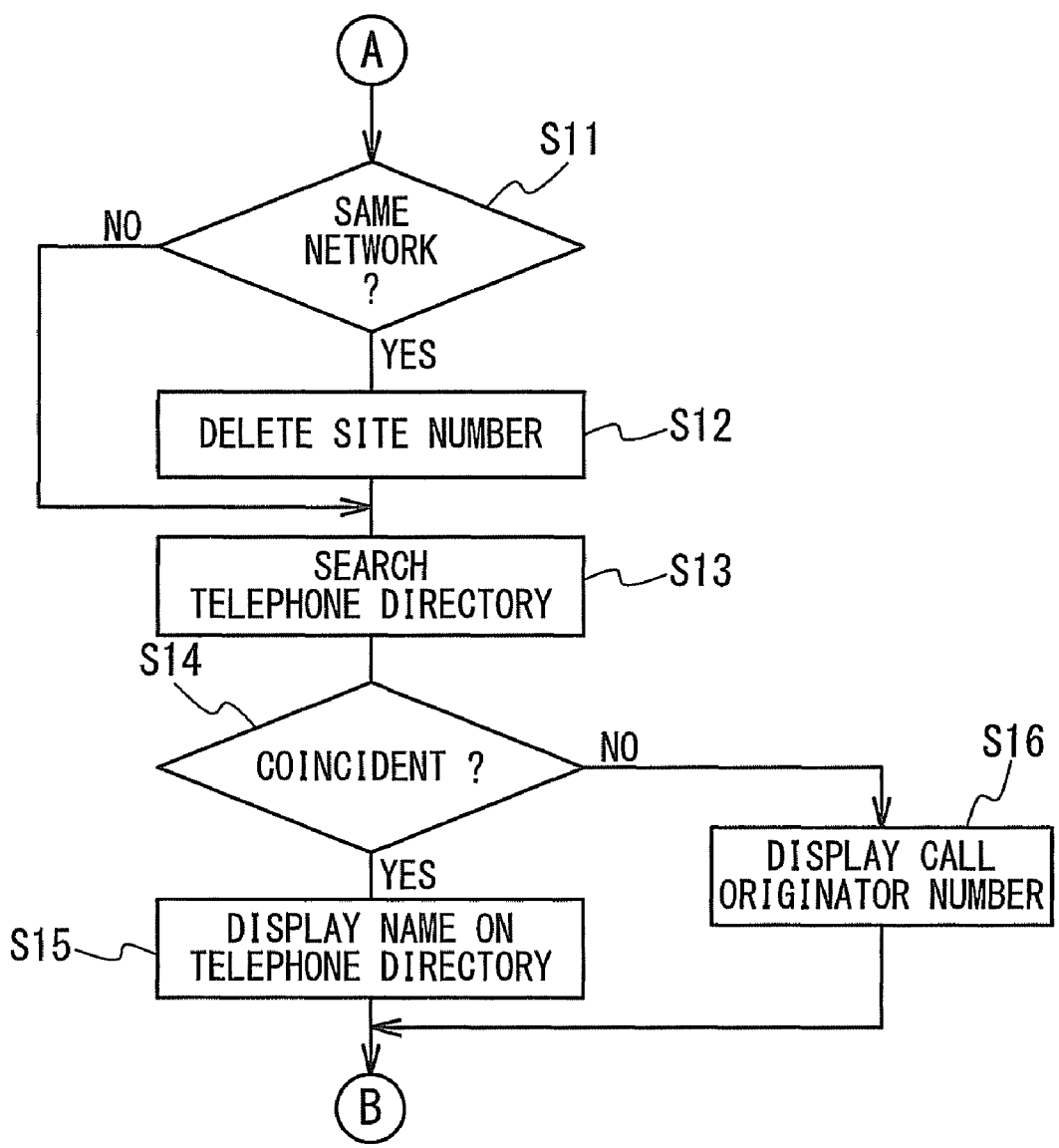
FIG. 5 is a flowchart showing the operation example of the mobile IP telephone apparatus according to the exemplary embodiment of the present invention.

FIGS. 4 and 5 are a flowchart showing an operation example of the mobile IP telephone apparatus 13 or 23 according to the exemplary embodiment of the present invention. The operation of the mobile IP telephone apparatus 13 or 23 according to the exemplary embodiment of the present invention will be described below with reference to FIGS. 1 to 5. It should be noted that the operation shown in FIGS. 4 and 5 is attained when the CPU 41 executes the control program 42a.

When receiving a call, the mobile IP telephone apparatus 13 or 23 receives an INVITE (connection request) (Step S1 in FIG. 4). When receiving the INVITE, the mobile IP telephone apparatus 13 or 23 stores a data of the network to which the telephone apparatus itself currently belongs (Step S2 in FIG. 4).

In succession, the mobile IP telephone apparatus 13 or 23 extracts a call originator number from the call originator data (Step S3 in FIG. 4) and determines whether or not the head of the call originator number is "0" (Step S4 in FIG. 4). If the head of the number is "0", the mobile IP telephone apparatus 13 or 23 recognizes that it is a public network number or a mobile phone number. In succession, the mobile IP telephone apparatus 13 or 23 checks a number in which the head number is "0", from the telephone directory already registered in the telephone directory storing area 431 (Step S5 in FIG. 4) and determines whether or not there is a coincident number (Step S6 in FIG. 4).

If detecting the same number, the mobile IP telephone apparatus 13 or 23 displays a name registered in the telephone directory (Step S7 in FIG. 4) and relates a current network data stored in the operation of the step S2 to the name and stores them (Step S9 in FIG. 4). Then, the mobile IP telephone apparatus 13 or 23 registers the data in the call reception history list held in the call reception history storing area 432 (Step S10 in FIG. 4).

If not detecting the same number, the mobile IP telephone apparatus 13 or 23 displays a call originator number (Step S8 in FIG. 4) and relates the current network data stored in the operation of the step S2 to the call originator number and stores them (Step S9 in FIG. 4). Then, the mobile IP telephone apparatus 13 or 23 registers the data in the call reception history list held in the call reception history storing area 432 (Step S10 in FIG. 4).

In case of the mobile phone apparatus with the IP telephone function, the mobile phone apparatus can have a mobile phone number used in the CDMA network 300, and an IP telephone number used in the intra-company IP networks 110 and 210. The number when the call is sent is different, depending on which of the lines is used. When the CDMA network 300 is used to originate the call, the call originator number is used to originate the call in case of the public network number or mobile phone number. However, when the IP telephone line of the intra-company IP network 110 or 210 are used to originate the call, the number in which the pre-fix number "0" is added to the head is used to originate the call.

In the technique described in the second related art, when the head of the call originator number is "0", the pre-fix number of "0" is added, and the call reception history is produced. However, in this exemplary embodiment, the pre-fix number is removed when the CDMA network 300 is used to originate the call. Thus, the call reception history is registered under its original call originator number.

Moreover, the mobile IP telephone apparatus 13 or 23 becomes an extension telephone of the intra-company IP network 110 or 210, if the head number is not "0" in the determination of whether or not the head of the call originator number is "0" at the step S4. In that case, whether or not the mobile IP telephone apparatus 13 or 23 belongs to the same network as the network for the data stored in the operation of the step S2 is determined (Step S11 in FIG. 5).

When it is determined to belong to the same network as the telephone apparatus itself, the mobile IP telephone apparatus 13 or 23 deletes or removes the site number added to the head of the call originator number (Step S12 in FIG. 5), and the same number as the number after the deletion is searched from an already registered telephone directory (Step S13 in FIG. 5). When belonging to the network different from the telephone apparatus itself, the mobile IP telephone apparatus 13 or 23 searches the telephone directory to know whether or not the call originator number is registered (Step S13 in FIG. 5).

The mobile IP telephone apparatus 13 or 23 determines whether or not there is the same number in the telephone directory (Step S14 in FIG. 5). If it is already registered in the telephone directory, the name registered in the telephone directory is displayed (Step S15 in FIG. 5), and the current network data stored at the step S2 is related to the name and then they are stored (Step S9 in FIG. 4). Then, the data is registered in the call reception history held in the call reception history storing area 432 (Step S10 in FIG. 4).

When the same number is not searched in the telephone directory, the mobile IP telephone apparatus 13 or 23 displays the call originator number (Step S16 in FIG. 5), and the current network data stored at the step S2 is related to the call originator number, and then they are stored (Step S9 in FIG. 4). Then, the data is registered in the call reception history held in the call reception history storing area 432 (Step S10 in FIG. 4).

FIGS. 6A and 6B to FIG. 10 are diagrams showing examples of the call reception history according to the exemplary embodiment of the present invention. The actual examples when the call originator number is the intra-company number will be described with reference to FIG. 1, FIGS. 6A and 6B to FIG. 10.

The mobile IP telephone apparatus 13 currently belongs to the intra-company IP network 110 (the site number: 110) of the site A. When a call is originated from the fixed IP telephone apparatus 12 (the company extension number: 8-110-12345), which is connected to the intra-company IP network 110 of the same site A, to the mobile IP telephone apparatus 13 (the company extension number: 8-110-12355), the mobile IP telephone apparatus 13 determines that the call is from the same network inside the company, on the basis of the call originator number. Accordingly, the mobile IP telephone apparatus 13 removes the site number of the head of the call originator number, because the call originator belongs to the same network, and relates the network to which the telephone apparatus itself belongs to the removed call originator number to store in the call reception history.

An example of a call reception history at this time is shown in FIG. 6A. The site number (110) to which the mobile IP telephone apparatus 13 currently belongs as a call received site, the site number (110) of a counter node as the call originator site, and a telephone number (12345) from which the site number of the head of the call originator number of the fixed IP telephone apparatus 12 is removed are stored in the call reception history storing area 432 as a call reception history. Since the site number is registered in advance as the pre-fix number, the call received site of the call reception history can be checked under the site name. Also, as for the telephone number registered in the telephone directory, the call reception history can be left in relation to a registration name (Mr. A). The example of the call reception history in this case is shown in FIG. 6B.

Moreover, when the call is originated from the mobile IP telephone apparatus 23 (the company extension number: 8-210-22345), which is connected to the intra-company IP network 210 of the site B, to the mobile IP telephone apparatus 13 of the site A, the mobile IP telephone apparatus 13 determines that the call is from the different network inside the company, on the basis of the call originator number. Since the mobile IP telephone apparatus 23 belongs to the different network, the mobile IP telephone apparatus 13 relates the call originator number and the network to which the telephone apparatus itself belongs to store in the call reception history. The example of the call reception history in this case is shown in FIG. 7.

Next, it is supposed that a person who has the mobile IP telephone apparatus 13 using the intra-company IP network 110 of the site A goes out into the site B. The mobile IP telephone apparatus 13 can belong to the intra-company IP network 210 of the site B, and the operation for receiving/transmitting the call is carried out by using the intra-company IP network 210 of the site B.

When a call is originated from the mobile IP telephone apparatus 23 (the company extension number: 8-210-22346), which is connected to the intra-company IP network 210 of the site B, to the mobile IP telephone apparatus 13 belonging to the intra-company IP network 210 of the site B, the mobile IP telephone apparatus 13 determines that the call is from the same network as the mobile IP telephone apparatus 13 inside the company, on the basis of the call originator number. Since the mobile IP telephone apparatus 13 belongs to the same network, the site number of the head of the call originator number is removed, and the network to which the mobile IP telephone apparatus 13 belongs is related to the removed call originator number and then stored in the call reception history. The example of the call reception history in this case is shown in FIG. 8.

Moreover, when a call is originated from a different mobile IP telephone apparatus, which belongs to the intra-company IP network 110 of the site A, to the mobile IP telephone apparatus 13 belonging to the intra-company IP network 210 of the site B, the mobile IP telephone apparatus 13 determines that the call is from a different network inside the company, on the basis of the call originator number. Since the different mobile IP telephone apparatus belongs to the different network, the mobile IP telephone apparatus 13 relates the call originator number and the network to which the different mobile IP telephone apparatus 13 belongs and then stores in the call reception history.

The belonging network data when the call is received is related to the call reception history, and is stored. Therefore, when the stored call reception history is used to originate a call, the belonging network data is compared with the currently belonging network data, and whether or not the site number is to be added is determined, and the site number may be automatically added, if needed.

Here, the addition example of the pre-fix number will be described with reference to FIG. 9. When it is determined to be a call from the public telephone network 100, the pre-fix number "0" is determined to be added when the call is originated, and a telephone number (0-03-1234-5678) to which the pre-fix number "0" is added is stored in the call reception history.

Also, the adding example of the site number will be described with reference to FIG. 10. FIG. 8 shows the example of the call reception history in which, when the mobile IP telephone apparatus 13 using the intra-company IP network 110 of the site A belongs to the intra-company IP network 210 of the site B, the call is originated from the mobile IP telephone apparatus 23 (the company extension number: 8-210-22346), which is connected to the intra-company IP network 210 of the site B, to the mobile IP telephone apparatus 13 belonging to the intra-company IP network 210 of the site B.

A case is considered that the call reception history is used to originate a call from the mobile IP telephone apparatus 13, which belongs to the intra-company IP network 110 of the site A, to the mobile IP telephone apparatus 23 connected to the intra-company IP network 210 of the site B. Although belonging to the intra-company IP network 210 of the site B when the call was received, the mobile IP telephone apparatus 13 currently belongs to the intra-company IP network 110 of the site A. Thus, if based on the call reception history, a call is originated to the telephone number from which the site number of the head of the call originator number is removed, the telephone number is regarded as the telephone number inside the intra-company IP network 110 of the site A.

For this reason, the call reception history shown in FIG. 8 is used to compare the network (the site A) to which the mobile IP telephone apparatus 13 currently belongs with a network of the call received site (the site B) of the call reception history. At this time, the currently belonging network data differs from the belonging network data stored in the call reception history shown in FIG. 8, and the call originator is located at the site A. Thus, the site number is determined to be added when the call is originated, and the telephone number (8-210-22346) to which the site number is added is stored in the call reception history as shown in FIG. 10.

In this way, in this exemplary embodiment, when there is a call reception in the mobile IP telephone apparatus 13 or 23 and the mobile phone with the IP telephone function, the data of the network to which the telephone apparatus belongs and its call originator number are related and recorded. Thus, at the time of the call reception, whether the call originator belongs to a same network, a different network or the public network can be determined and the determination result is left in the call reception history. Also, in this exemplary embodiment, when the call reception history is used to originate the call, the pre-fix number can be automatically added in accordance with the previously related data, and the call can be originated.

According to the present invention, by employing the above-mentioned configuration and operation, the determination result of whether a counter communication node belongs to the same network as the telephone apparatus itself or the different network or the public network can be left in the call reception history. Thus, it is possible to attain the effect that, when the call reception history is used to originate the call, the pre-fix number can be automatically added on the basis of the previous relation, and the call can be originated.

As mentioned above, the exemplary embodiments of the present invention have been described. However, they are only intended to describe the present invention. It would be apparent to a person skilled in the art that various modifications are possible without departing from the spirit and scope of the present invention. Also, it may be evident that the limited construe of the appended claim is impossible.

The invention claimed is:
1. A mobile phone apparatus which has a storing area for storing a call reception history and in which an IP telephone a communication is possible by using an IP (Internet Protocol) telephone function, comprising:
- a network data acquiring section configured to acquire data indicating a type of network to which said mobile phone apparatus belongs;
- an originator data acquiring section configured to acquire a call originator data at a time of a call reception;
- a relating section configured to relate the acquired data indicating the type of network and the acquired call originator data to register in said storing area;
- a determining section configured to determine whether a call originator is a public line network or an IP telephone; and
- a registering section configured to register the determination result in the call reception history,
- wherein when a call is originated based on the call reception history, a prefix number is added to the call originator data based on the call reception history and a current network data indicating a network to which said mobile phone apparatus belongs.

2. A call reception history producing method used in a mobile phone apparatus which has a storing area for storing a call reception call history and in which an IP telephone communication is possible by using an IP (Internet Protocol) telephone function, said call reception history producing method comprising:
- acquiring data of indicating a type of network to which said mobile phone apparatus belongs;
- acquiring a call originator data at a time of call reception;
- relating the acquired data indicating the type of network and the acquired call originator data to register in said storing area; and
- determining whether a call originator belongs to a same network as said mobile phone apparatus, a different network from said mobile phone apparatus or a public line network, from the acquired network data and the acquired call originator data; and
- registering the determination result in the call reception history,
- wherein when a call is originated by using the call reception history, a prefix number is added to the call originator data based on the call reception history and a current network data indicating a network to which said mobile phone apparatus belongs.

* * * * *